Aug. 25, 1959 — C. H. SAMPLES — 2,901,058
SEPARATOR
Filed Sept. 20, 1957

CLETUS H. SAMPLES
INVENTOR

Sidney A. Johnson
ATTORNEY

2,901,058
SEPARATOR

Cletus H. Samples, Midland, Tex., assignor, by mesne assignments, to Socony Mobil Oil Company, Inc., New York, N.Y., a corporation of New York Application September 20, 1957, Serial No. 685,315

8 Claims. (Cl. 183—2.7)

This invention relates to the separation of gases, liquids, and solids and more particularly relates to apparatus employed in gas drilling operations for separating cuttings and liquids flowing from the earth into the well from the gas.

Traditionally, drilling fluids, frequently referred to as drilling muds, have been employed in the drilling of oil wells. The fluids are circulated downwardly into a well bore through the drill pipe, through and out of the drill bit, and back to the surface in the annulus around the drill pipe. The drilling fluids function to provide a hydrostatic pressure on gas and liquid zones penetrated by the well bore, to cool the drill bit, and to remove the cuttings from the well bore. The cuttings return to the surface where they are separated from the drilling fluid, and the drilling fluid is reconditioned and recirculated into the well bore.

Recently, it has been found possible in many cases to effect economies by the employment of gas in lieu of liquid drilling fluids in the drilling of oil wells. The gas performs the same functions as the liquid drilling systems. The gas used may be natural gas, air, or any other gas which is economically available.

The use of gas in drilling is particularly desirable in those cases where existing oil wells are being drilled deeper. For example, it has been the practice to use oil or oil base drilling fluids in deepening existing wells inasmuch as conventional drilling fluids tend to contaminate penetrated oil zones. The use of oil or oil base drilling fluids, however, has several disadvantages, including the cost of the system and the fact that they are objectionable to drilling crews. It has been found that the disadvantages of the use of oil or oil base drilling fluids may in many instances be avoided by using gas as the drilling medium.

Employment of natural gas in drilling is practical if a supply of gas is available near the well and is economically more feasible if the gas may be sold for fuel purposes after it has served its function in the drilling operation. Such sale necessitates that the cuttings and earth liquids which become mixed with the gas in the well bore be separated from the gas at the surface in order that the gas may be piped on to sales facilities.

Separation of gas, cuttings, and earth liquids is generally desirable where drilling is done with air or a gas even though the gas serves no further function subsequent to drilling. This is especially true where the earth liquids, which become mixed with the gas during drilling, include oil. The separated gas may be vented to the atmosphere or burned, if combustible, and the oil may be recovered from the cuttings.

It is, therefore, an object of the present invention to provide apparatus for use in gas drilling operations to separate liquids, gases, and cuttings. This and other objects of the invention will be apparent from the following description of the invention.

A preferred embodiment of the invention is illustrated in the accompanying drawings, in which, Fig. 1 is a front view of one embodiment of a separator constructed in accordance with the invention;

Figure 1:
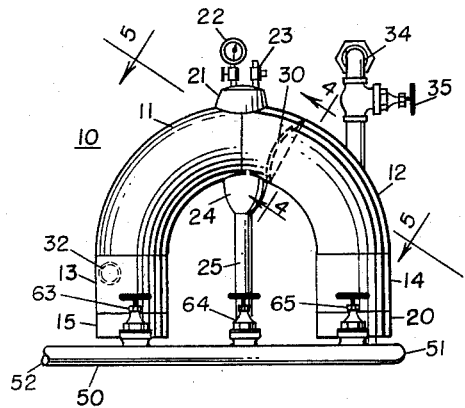

Referring to the drawings, the reference numeral 10 designates the main body portion of the separator which is a U-shaped, hollow structure closed at both ends and circular in cross section. The bight of the U is in an upward position with the legs of the U being positioned vertically and extending downwardly from the bight. Body 10 might, in other terminology, be considered to be shaped as an inverted U. Body 10 may be conveniently constructed by welding together 90° elbows 11 and 12, straight members 13 and 14, and closure caps 15 and 20. For purposes of reference, the leg containing member 13 shall be referred to as the inlet leg and the leg containing member 14 shall be referred to as the outlet leg.

Welded into the top of body 10 is a dome 21 which is provided with a pressure gauge 22 and a safety valve 23. The pressure in body 10 is indicated by the pressure gauge, while protection against excessive pressure is provided by the safety valve.

Secured into the bottom side of the bight of body 10 is a cup-shaped cuttings trap 24. Trap 24 is open at its lower end and positioned so that its longitudinal axis is coincident with a vertical line passing through the center line of body 10 along the center of the bight of the body. Conduit 25 is connected to the open lower end of trap 24 and extends downwardly parallel to and midway between the inlet and outlet legs of body 10.

Figure 5:
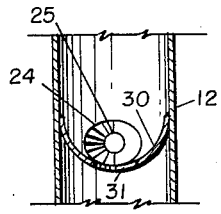
Fig. 5 is a partial view taken along the line 5—5 of Fig. 1.
Figure 2:
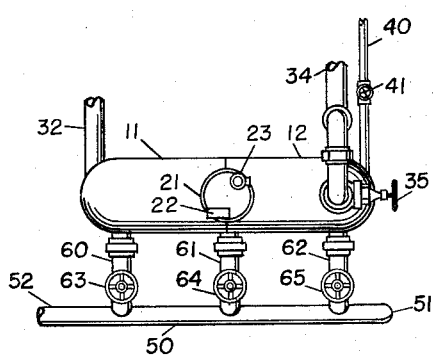
Fig. 2 is a plan view of the separator of Fig. 1.
Figure 4:
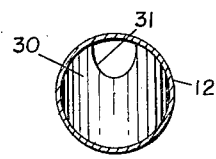
Fig. 4 is a view taken along the line 4—4 of Fig. 1.

Baffle 30 is secured along its perimeter to the inside surface of body 10 as shown in Fig. 1 and functions to deflect cuttings into trap 24. The outline of the baffle is substantially elliptical and the baffle is provided in its upper portion with a curved opening 31, as shown in Fig. 4, to permit the passage of gas and entrained earth liquids. The baffle, as shown in Fig. 5, is shaped into substantially circular form in a plane which is parallel to its major axis and perpendicular to its minor axis. The baffle is secured within body 10 such that a portion of its lower perimeter coincides with the juncture between trap 24 and body 10 as may be seen in Fig. 5. The baffle, as shown in Fig. 1, is positioned such that its minor axis is at an acute angle with the longitudinal axis of trap 24, though it is to be understood that the baffle may be secured in other positions, as the vertical, which will permit cuttings striking it to readily fall into the cuttings trap.

An inlet conduit 32 is connected into the inlet leg of body 10 and serves to convey gas, cuttings, and earth liquids to the separator from the annulus between the drill pipe and the casing of an oil well, not shown. Conduit 32, in the embodiment of the invention illustrated, is connected into member 13 at a point above the bottom of the inlet leg and spaced apart from the longitudinal axis of member 13 in order that the material passing through the conduit will enter the separator tangentially. By introducing the material passing through the conduit tangentially into the separator, erosion of the internal surface at the point of entry due to impingement of the material upon the surface is minimized and the resultant centrifugal force imparted to the material causes some separation of the cuttings from the gas and entrained liquids.

Figure 3:
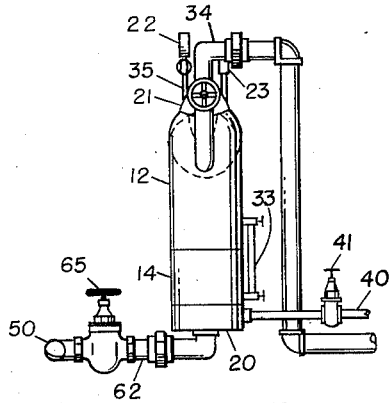
Fig. 3 is a side view of the separator of Fig. 1.

The outlet leg of the separator is provided with a gauge glass 33 connected to body 10 as shown in Fig. 3. The gauge glass permits observation of the level of collected liquids in the outlet leg of the separator. An outlet conduit 34 is connected to the outlet leg of the separator at a position in the bight of body 10 downstream from baffle 30. Conduit 34 extends to gas sales facilities, not shown, and functions to convey gas from the separator to these facilities. If the gas used in drilling were air or another gas which could serve no further function after drilling, conduit 34 may extend to a point where the gas may be released to the atmosphere or burned if it is combustible. Conduit 34 is provided with a valve 35. Liquid outlet conduit 40 is secured into the outlet leg of the separator near its lower end and leads to a blow-down tank, not shown, where any oil which may be produced during the drilling operation can be recovered. Conduit 40 is provided with a valve 41.

Dump line 50 is provided to convey cuttings and earth liquids from the separator to a blow-down tank, not shown, where the earth liquids and cuttings may be separated, if so desired. Dump line 50 is closed at the end denoted by reference numeral 51 and is connected to the previously mentioned blow-down tank at the end indicated by reference numeral 52. The dump line is connected to the separator body by conduits 60, 61, and 62, provided with valves 63, 64, and 65, respectively. Conduit 60 is connected into the bottom of cap 15 on the inlet leg. Conduit 61 is connected to conduit 25. Conduit 62 is connected into the bottom of cap 20 on the outlet leg. The conduits 60, 61, and 62 are employed to empty cuttings and earth liquids from the separator into dump line 50.

In the operation of the separator, as previously mentioned, conduit 32 is connected to the casing of a well, not shown, and serves to conduct from the annulus between the drill pipe and the casing to the separator the combination of gas which has been used for drilling, cuttings which have become mixed with the gas during drilling, and earth liquids which have become entrained in the gas. Conduits 40 and 50 are connected to a blow-down tank, not shown. Conduit 34 is connected to sales facilities or other facilities, not shown, which will utilize, or dispose of, the separated gas. As the combination of gas, cuttings, and earth liquids enters the separator, it is caused to spin or rotate within the inlet leg, resulting in centrifugal separation of some of the cuttings, which settle into the lower portion of the inlet leg. The gas and the remaining cuttings and earth liquids flow upwardly through the inlet leg into the bight of body 10 until they strike baffle plate 30, at which point the cuttings fall downwardly along the baffle plate into trap 24 and then into conduit 25. The gas and entrained liquids pass through opening 31 in the baffle plate into the outlet leg of the separator. The liquids drop downwardly into the lower portion of the outlet leg, and the gas passes from the separator through conduit 34. Periodically, as sufficient amounts of cuttings and liquids collect within the inlet and outlet legs and conduit 25, valves 63, 64, and 65 are opened to permit the cuttings and liquids to be blown into conduit 50 through which they flow to a blow-down tank where the liquids may be recovered. After the cuttings and liquids have been emptied from the separator, valves 63, 64, and 65 are closed. If sufficiently large quantities of liquids are in the gas being processed, valve 41 in conduit 40 may be adjusted to permit constant drain-off of these liquids to a blow-down tank. If desired, automatic facilities responsive to the liquid level in the separator may be connected to conduit 40 to permit constant removal of the liquids from the separator. Complete emptying of the separator, however, may be carried out manually by manipulation of valves 63, 64, and 65.

While the invention has been described in connection with certain specific embodiments thereof, it will be understood that further modifications will suggest themselves to those skilled in the art, and it is intended to cover such modifications as fall within the scope of the appended claims.

What is claimed:

1. A gas-liquid-cuttings separator which comprises in combination an inverted U-shaped, hollow body closed at opposite ends and having an inlet leg and an outlet leg, a cuttings trap secured to said body and extending downwardly therefrom intermediate said inlet leg and said outlet leg, a baffle secured within said body adjacent to said cuttings trap and adapted to deflect cuttings into said trap, said baffle being provided with an opening to permit the passage of gas and entrained liquids, means for introducing gas, cuttings, and liquids into said inlet leg, means for removing gas from said outlet leg, and means for removing cuttings and liquid from said separator.

2. A gas-liquid-cuttings separator which comprises in combination a U-shaped, hollow body closed at opposite ends, the bight of the U being in an upward position and the legs of the U extending downwardly from said bight, a cuttings trap connected to and exceeding downwardly from the bottom of the bight of said U, a baffle secured within said body adjacent to said cuttings trap to deflect cuttings into said trap, said baffle being provided with an opening to permit the passage of gas and entrained liquids, means for introducing gas, cuttings, and liquids into said body, means for removing gas from said body, and means for removing cuttings and liquids from each of said legs and said cuttings trap.

3. A device for continuously separating earth liquids and solids from a gaseous drilling fluid comprising an inverted U-shaped, hollow shell and end members forming a substantially closed pressure-tight vessel, a trap for solids and liquids located on the under side of said shell at the bight of the U, a downwardly extending discharge leg connected to the base of said trap, a drilling fluid inlet connected to the lower portion of one leg of said shell and spaced from the end member, an inclined baffle in the other, outlet leg of said shell the lower end of which is adjacent said trap so that liquids and solids impinging against said baffle will run off by gravity into said trap, at least one opening for the passage of gas in the upper portion of said baffle, an outlet for separated gas from a high point of the outlet leg of said shell on the side of said baffle away from the drilling fluid inlet, a valve for controlling the back pressure on said gas outlet, outlets for solids and liquids connected to said trap discharge leg and to each leg of said shell adjacent the end members, and valve means for controlling flow from each of said solids and liquids outlets.

4. A device in accordance with claim 3 in which the U-shaped, hollow shell is circular in cross section.

5. In a separator for separating gas, cuttings, and liquids, the combination which comprises an inverted U-shaped, hollow body closed at opposite ends and having a bight in an upward position and an inlet leg and an outlet leg extending downwardly from said bight, a cup-shaped cuttings trap secured to said body at the bottom and along the center line of said bight, a conduit secured to said cuttings trap and extending downwardly intermediate said inlet and outlet legs, a baffle secured around its perimeter to the inside surface of said body, the surface of said baffle being formed to a curvature sufficient to permit a portion of its perimeter to coincide with the juncture between said cuttings trap and said body, said baffle being provided in its upper portion with an opening to permit the passage of gas and entrained liquids, means secured to said body adapted to conduct gas, cuttings, and liquids into said body, means secured to said body adapted to conduct gas from said body, and means secured to said body adapted to conduct cuttings and liquids from said inlet and outlet legs and cuttings trap.

6. In a separator in accordance with claim 5 in which the U-shaped, hollow body is circular in cross section.

7. In a separator for separating gas, cuttings, and liquids, the combination which comprises a U-shaped, hollow body closed at opposite ends, the bight of the U being in an upward position, the legs of the U comprising an inlet leg and an outlet leg extending vertically downward from said bight, a cup-shaped cuttings trap secured to said body on the bottom side of said bight, the longitudinal axis of said trap being coincident with a vertical line through the center line of said body at the center of said bight, a substantially elliptically shaped baffle secured around its perimeter to the inside surface of said body on the downstream side of said cuttings trap, said baffle being provided in its upper portion with a curved opening to permit the passage of gas and entrained liquids, the surface of said baffle being formed to a curvature which permits a portion of the lower perimeter of said baffle to follow the juncture between the downstream side of said cuttings trap and said body, said baffle being so positioned that its minor axis forms an acute angle with the longitudinal axis of said cuttings trap, a dome secured to the top of said body, a pressure gauge and a safety valve connected to said dome, an inlet conduit connected tangentially into said inlet leg at a position above the bottom of said leg to permit material flowing through said conduit to enter said leg tangentially, a gas outlet conduit connected to said body at a position in said bight downstream from said baffle, a liquid outlet conduit provided with a valve connected to said outlet leg near the bottom of said leg, a gauge glass connected to said outlet leg, a dump line, a conduit provided with a valve connected between said dump line and the bottom of said inlet leg, a conduit provided with a valve connected between said dump line and said cuttings trap, and a conduit provided with a valve connected between said dump line and the bottom of said outlet leg.

8. A separator in accordance with claim 7 in which the U-shaped, hollow body is circular in cross section.

References Cited in the file of this patent

UNITED STATES PATENTS

| | | |
|---|---|---|
| 2,714,308 | Heck | Aug. 2, 1955 |
| 2,753,011 | Downs | July 3, 1956 |